E. W. M. BAILEY.
WINDOW GLASS CHANNEL.
APPLICATION FILED MAY 29, 1920.
1,374,629.
Patented Apr. 12, 1921.
2 SHEETS—SHEET 1.
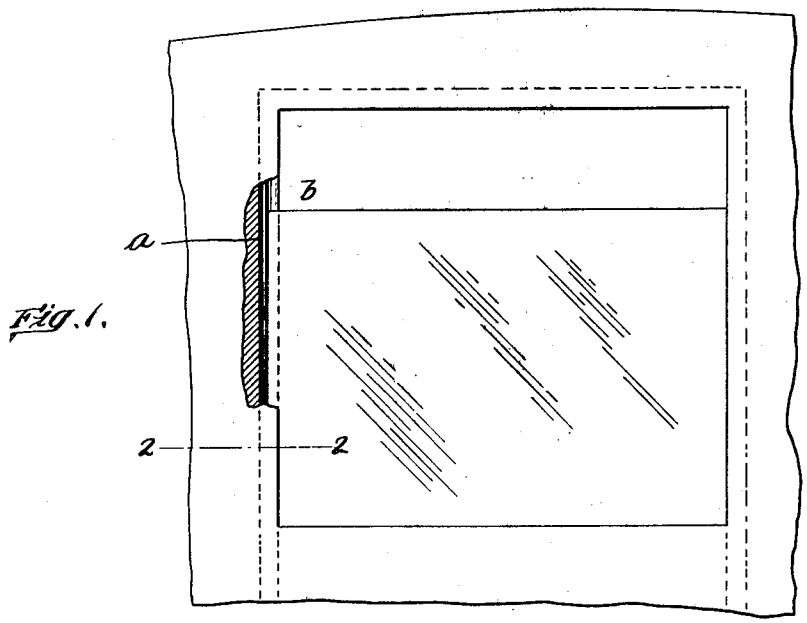
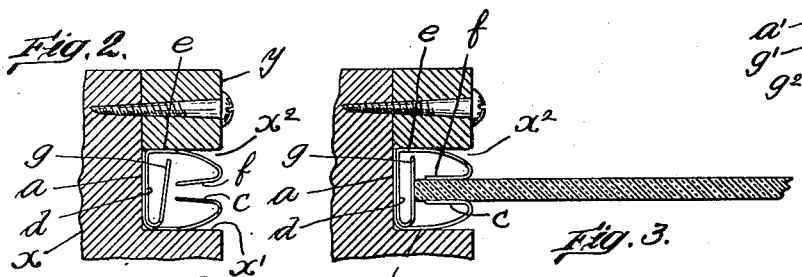
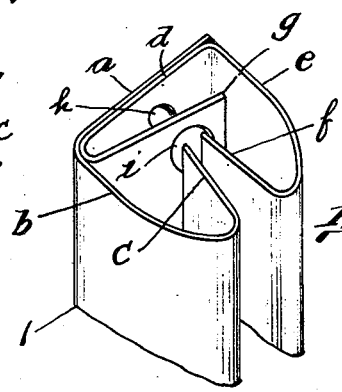
Inventor.
Edwin W. M. Bailey

E. W. M. BAILEY.
WINDOW GLASS CHANNEL.
APPLICATION FILED MAY 29, 1920.

1,374,629.

Patented Apr. 12, 1921.
2 SHEETS—SHEET 2.

Inventor,
Edwin W. M. Bailey
by
Atty.

UNITED STATES PATENT OFFICE.

EDWIN W. M. BAILEY, OF AMESBURY, MASSACHUSETTS.

WINDOW-GLASS CHANNEL.

1,374,629.

Specification of Letters Patent.     Patented Apr. 12, 1921.

Application filed May 29, 1920. Serial No. 385,197.

*To all whom it may concern:*

Be it known that I, EDWIN W. M. BAILEY, a citizen of the United States, and a resident of Amesbury, county of Essex, State of Massachusetts, have invented an Improvement in Window-Glass Channels, of which the following is a specification.

This invention relates to that class of devices known as window glass channels, or guides, which are principally employed in automobile bodies where the window glass is not fixed in a sliding frame, but is arranged to slide in grooves or slots formed in the window casing at each side of the window opening.

With such an arrangement it is necessary to provide some cushioning means between the sides or surface of the glass and the frame, and felt, rubber and heavy textile material, such as velvet, have been employed for this purpose. These materials are objectionable for this purpose for various reasons, some of the more important of which are that heavy cloth and felt are not sufficiently resilient for the purpose, so that the glass is frequently broken by sudden shock, or jar, and, when these materials are arranged to engage the glass sufficiently closely to prevent rattling, the friction thereon, where the glass is moved in its guides, is liable to be too great. Also, fabric will become worn or compressed from use, so that, while the glass may have been held in a reasonably satisfactory manner in the beginning, after some use it will be loosely held. Such material is also liable to wrinkle, or " bunch up " so that the glass will bind in its guideways.

While the use of rubber, in this connection, has been suggested, it has not, I believe, been extensively used in practice, on account of the possibility of deterioration.

Satisfactory means for cushioning the glass at its edges, against shock or jar in parallel with the surface, have not, so far as I am aware been produced.

On account of variations in the thickness and in the width of the plate glass which is usually employed, in the connection above noted, considerable difficulty is encountered, in the factory, in fitting the channels or guides to the glass.

The objects of my invention are to provide a form of channel, or guiding means, for a window glass, which may be advantageously employed in the particular relation above referred to, which will provide an effective means for both guiding and cushioning the glass, both at its sides and edges, without tending frictionally to retard the movements of the glass to an undesirable extent, so that it may be easily raised and lowered by mechanical means, or directly by hand.

Other objects of the invention are to provide a guiding means which will not become worn from use, and will constantly maintain the same degree of cushioning effect and frictional engagement, which is readily self adapting, within the limits which are likely to be found in practice, to plates of glass of different thicknesses and widths, which may be installed at a substantially reduced expense, as compared with the constructions now generally employed, and which, generally, will not be subject to the objections to prior arrangements above noted.

For a more complete understanding of my invention reference is made to the accompanying drawing in which:

Figure 1 is a front elevation, partly in section, of a window casing having a window glass channel embodying my invention.

Figs. 2 and 3 are detail cross sectional views thereof, on an enlarged scale.

Figs. 4 and 5 are side and front elevations of the window channel partly in section.

Fig. 6 is a detail perspective view, thereof.

Figs. 7 to 14 are detail views of modified forms of my invention, Fig. 12 being a longitudinal central sectional view of the form shown in Fig. 11.

Figure 8:
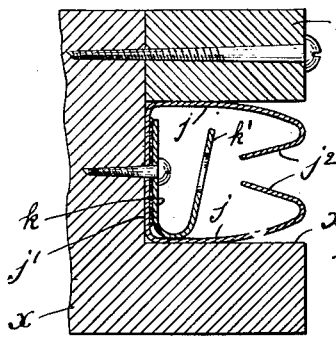

The window glass guide, or channel, embodying my invention, is constructed of one or more strips of thin sheet metal, which possesses a considerable degree of resiliency, but is adapted to be bent by means of dies, or equivalent means, into the desired form, and to be secured in the usual grooves, slots or channels formed in the sides of the window frame or casing, to provide yielding engaging and guiding means for the glass. The window casing groove, in which this means, for directly engaging the glass, is located, is formed in various ways, a common method being that indicated in Fig. 2, in which a portion, $x$, of the casing, is formed to provide a shoulder $x'$; and a molding $y$ is attached by screws to the casing, at a suitable distance from the shoulder $x'$; forming the groove or slot $x^2$.

In Figs. 1 to 6 are illustrated what I consider to be the preferred embodiment of my invention, although other forms, hereinafter described, possess many of the advantages thereof.

As shown in Figs. 1 to 6, the channel or guide, which is adapted to be secured in the groove $x^2$ of the window casing $x$, is composed of two connected, sheet metal strips or sections, which extend throughout the length of the casing groove. Each section is formed of a flat strip of metal, which is bent longitudinally, as hereafter described.

One of the sections comprises a flat base portion $a$, the width of which is equal to the width of the groove $x^2$, so that it will fit therein, against the bottom thereof, and one longitudinal edge of which is the edge of the strip.

A longitudinal bend, of approximately 90°, is formed in the strip at the other side edge of said base portion, to provide a side portion $b$, which is bent inwardly, or over the base portion, in a gradual curve, as it extends therefrom, and then is bent nearly semi-circularly, and extended toward the base portion, to form a yielding engaging lip $c$, which is disposed in a slightly oblique relation to the base.

The other strip or section is also formed to provide a base portion $d$, which is intermediate the strip, said strip being bent longitudinally, at one side edge of said base portion, through approximately 90°, to form a side portion $e$, the end portion of which is bent inwardly and semi-circularly, to form a yielding lip $f$, both being shaped to correspond to the portions $b$ and $c$ of the other section. The strip is also bent nearly semi-circularly, or reversely at the other side edge of the base portion $d$, to provide a spring plate $g$, which extends somewhat divergently from the bend, relative to the base portion $d$, toward the side portion $e$.

In assembling the two strips, the base portion $d$ is placed on the base portion $a$, so that the side portions $b$ and $e$ and lips $c$ and $f$, respectively, are held in oppositely disposed position, and then said bases are secured together, permanently, by solder, or any other convenient means.

The particular lateral position in which the base portions are secured may be varied, and will depend on the width of the groove, or space between the shoulder $x^1$ and side of the molding $y$, in which the guiding strips are to be placed. That is, the distance between the outer sides of the side portions $b$ and $e$ will be made to equal the width of said groove or space, so that, when the guide is placed in position, and the molding secured in place, it will be firmly held between the sides of the groove. In practice, however, the grooves which receive the guides will be made of standard width, so that when the strips are pressed together laterally, as closely as possible, and then secured, the resulting guide strip will be of a corresponding width. When the guide is in position, its face will be held against the bottom of the groove, and the reversely curved ends of its sides will be flush with the surface of the molding, or window casing, as shown in Figs. 2 and 3.

While the guide may be held in position by the clamping action of the molding $y$ against its side, it is preferably secured in position by screws, which pass through the base into the casing. A convenient method is to form screw holes $h$ in the base portions $a$ and $d$ and an aperture $i$ in the spring plate $g$, which is of greater diameter than the screw head, so that the screw may be passed therethrough and its head may be forced against the base portion $d$, as shown in Fig. 4.

As thus arranged, the lips $c$ and $f$ will be held equidistant from the middle line of the casing groove and will extend convergently inward to a point in proximity to the spring $g$, at which point their ends will be separated a distance which is less than the thickness of any sheet of glass which is likely to be placed therebetween. This construction permits the ready insertion of the edge portion of a glass plate between the lips, and, when this is done, the side portions $b$ and $e$ will be pressed back toward the sides of the grooves, until they lie flat thereagainst, and then the lips $c$, $f$, will be pressed back, if necessary, until they lie flat against the glass. The construction will be such that this limit will not ordinarily be reached.

The above described construction is thus adapted to receive, and yieldingly engage, glass plates of as wide variation in the thickness as are likely to be employed for the purpose. The spring action is so distributed that the force of frictional engagement increases but slightly in proportion to increasing thickness of the glass sheet, so that the force of frictional engagement of the lips with the glass is not sufficient to interfere with the ready raising and lowering of the glass, by any means, whatever the thickness of the glass, within ordinary limits.

As previously stated, the glass plates ordinarily employed vary somewhat in width, as well as in thickness, and, in practice, their widths will be sufficient to engage the springs $g$ at each side edge, and press them toward the base portions to an extent dependent on the width of the plates, the extent to which the springs are adapted to yield being sufficient for all variations in width which are likely to occur.

The glass plate will thus be yieldingly supported and guided at its edge and sides, so that it will be effectively cushioned against all shocks or blows which would tend to break it. The guide may also be employed, to advantage in position to receive the upper end of the glass, when in closed position, to prevent rattling at this point. As the engaging surfaces are of metal, they may be lubricated, if desired, and the conditions will not materially change after extensive use.

While I consider the above described construction to be the preferred embodiment of my invention, there are various other embodiments thereof, the more important of which I will now describe.

In Fig. 7 a slightly modified form of the construction of Fig. 6 is shown, in which each section is made of a double thickness or relatively thin sheet metal, two strips of sheet metal being bent into the form of each section, and arranged so that the corresponding spring members provided thereby may yield successively. That is, one section is composed of two strips bent to form base portions $a'$, $a^2$, side portions $b'$, $b^2$ and $e'$, $e^2$, lips or side springs $c'$, $c^2$ and $f'$, $f^2$ and edge springs $g'$, $g^2$. These strips are formed to lie in close engagement, except at the end portions of the springs, which are normally held in divergent relation, so that the springs first engaged by the glass will yield to a certain extent before their spring action will be reinforced by the other spring.

The advantage of this arrangement, over the one first described, is that the strength and resiliency of the double sheets will be greater than that of a single sheet of twice the thickness and the danger of cracking, due to bending, is less with the thinner sheets than with the thicker sheets.

Other forms of somewhat different types are illustrated in Figs. 8 to 14.

In Fig. 8 a single strip is bent to provide two side portions $j$, and intermediate base portions $j'$, and inwardly turned lips $j^2$ at the ends of said side portions. A single strip of metal is bent longitudinally to provide a base portion $k$, which is soldered, or otherwise secured on the base portion $j'$, and a spring $k'$, all of said parts being similarly located and having similar functions to the corresponding parts of the form of Fig. 6.

Figure 9:
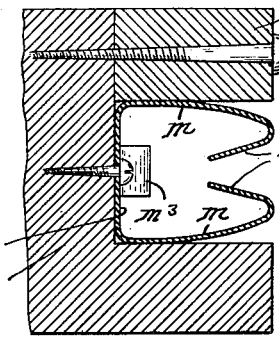
Figure 10:
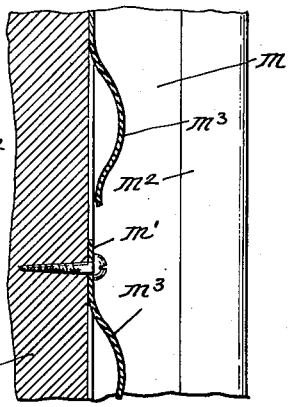

The form shown in Figs. 9 and 10 consists of a single strip of metal bent to provide side portions $m$, an intermediate base portion $m'$, and inturned lips $m^2$, similar to the corresponding portions of the form shown in Fig. 8, but, in this instance, springs $m^3$, for the edges of the glass, are formed integrally with strips, by cutting them out of the middle of the base portion, at suitable intervals, said springs being formed to extend longitudinally of the strip.

This construction possesses advantages over the previously described construction principally in the matter of cost of manufacture, which is believed to be less.

Figure 11:
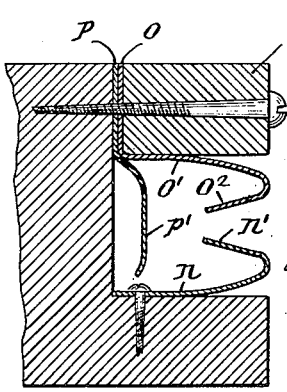

In Fig. 11 a construction is shown which is made up of three independent strips of metal. One of the strips, $n$, is secured by screws, to one side of the groove, adjacent its bottom and extends transversely outwardly, divergently with relation to the side of the groove, to which it is secured, and then is bent inward to form a lip $n'$. At the opposite side, a second strip is provided, consisting of a base portion $o$, and a side portion $o'$, having an inturned lip $o^2$, said side portion being disposed at right angles to the base portion $o$, and the latter being clamped beneath the molding strip $y'$, which forms one side of the groove. The third strip consists of a portion $p$, which is secured beneath base portion $o$ and a spring portion $p'$, which is formed to provide a yielding engaging means for the edge of the glass.

Figure 12:
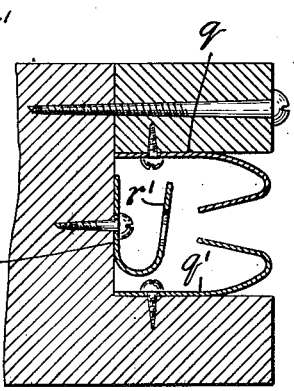

In the construction of Fig. 12, spring strips $q$, and $q'$, similar to the strip $n$ of Fig. 11, are secured on each side of the groove, and a strip, bent to provide a base portion $r$, and a spring arm $r'$, is secured on the bottom of the groove, in the middle thereof.

Figure 14:
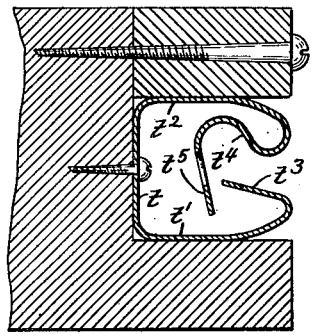
Figure 13:
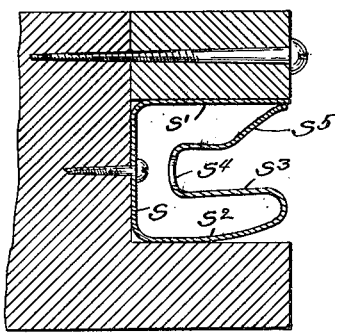

In Figs. 13 and 14, the forms shown consist of a single metal strip bent to provide yielding means for both sides and edges of the glass.

In Fig. 13 the strip is shown as bent to provide a base portion $s$ and side portions $s'$ and $s^2$, the side portion $s'$ being formed to lie flat against one side of the groove and the side portion $s^2$ being bent reversely inward to form a portion $s^3$, for engaging one side of the glass, then reversely outward, to form a portion $s^4$, for engaging its edge, and portion $s^5$, for engaging the opposite side of the glass, and then obliquely into engagement with, or into close proximity to the side portions $s'$.

The form of Fig. 14 is similar to that of Fig. 13 and comprises an intermediate base portion $t$ and side portions $t'$, $t^2$, one of which is bent reversely inward, to form a lip $t^3$, for one side of the glass, and the other of which is bent inwardly and then in a direction approximately parallel to the base portion, to provide a portion $t^4$, for engaging the opposite side of the glass, and a portion $t^5$ for engaging its edge.

The forms shown in Figs. 8, 9, 13 and 14 are adapted to be secured in position by screws in a manner similar to that described in reference to the form of Fig. 6.

I claim—

1. In combination with a window casing having a window-glass-receiving groove, guiding means in the groove arranged to engage each side of the glass and comprising a longitudinally extended strip of resilient sheet metal disposed at one side of the groove and transversely extending outwardly from the bottom thereof with its outer portion out of contact with said side to permit said portion to yield toward said side, the outer edge-portion of the strip being reversely extended inwardly in divergent relation to its outwardly extending portion, to provide a yielding guiding and engaging portion for the adjacent surface of the glass.

2. In combination with a window casing having a window-glass-receiving groove therein, guiding means in the groove arranged to engage each side of the glass and comprising a longitudinally extending strip of resilient sheet metal disposed in engagement with one side of the groove at its bottom and transversely extended in divergent relation to said side from the bottom thereof, to permit the strip to yield toward the side at the outer portion of the groove, the outer edge portion of the strip being reversely extended inwardly in divergent relation to its outwardly extending portion to provide a yielding engaging portion for the adjacent surface of the glass.

3. In combination with a window casing having a window-glass-receiving groove, guiding means in the groove arranged to engage each side of the glass and comprising a longitudinally extended strip of resilient sheet metal disposed at one side of the groove and transversely extending outwardly from the bottom thereof with its outer portion out of contact with said side to permit said portion to yield toward said side; the edge-portion of the strip being reversely extended inwardly to provide a yielding engaging portion for the adjacent surface of the glass adapted to yield toward the outwardly extending portion of the strip when the latter has been forced into engagement with the side of the groove.

4. In combination with a window casing having a window-glass-receiving groove, guiding means in the groove arranged to engage each side of the glass and comprising a longitudinally extended strip of resilient sheet metal disposed at one side of the groove and transversely extending outwardly from the bottom thereof with its outer portion out of contact with said side to permit said portion to yield toward said side, the edge-portion of the strip being reversely extended inwardly in divergent relation to its outwardly extending portion, to provide a yielding guiding and engaging portion for the adjacent surface of the glass, and a metal spring arranged in the bottom of the groove for yieldingly engaging and guiding the glass at its edge.

5. In combination with a window casing having a window-glass-receiving groove, resilient sheet metal guides longitudinally extended at each side of the groove and transversely extended outwardly from the groove bottom in convergent relation with each other and divergent relation with the sides of the groove, the outer edge portions of the guides being reversely extended inwardly and toward each other, to provide yielding engaging portions for the opposite surfaces of the glass, and said outwardly extending portions providing yielding supports for said engaging portions.

6. In combination with a window casing having a window-glass-receiving groove, resilient sheet metal guides longitudinally extended at each side of the groove and transversely extended from the groove bottom an convergent relation with each other and divergent relation with the sides of the groove, the outer edge portions of the guides being reversely extended inwardly and toward each other, to provide yielding engaging portions for the opposite surfaces of the glass, and said outwardly extending portions providing yielding supports for said engaging portions, and a resilient metal guide arranged in the middle of the groove, between said engaging portions and the groove bottom, for yieldingly engaging the edge of the glass.

7. A window glass channel comprising a pair of strips of resilient sheet metal, each bent to provide longitudinally extending and angularly disposed base and side portions, said strips being relatively arranged with their base portions secured one on the other, and with their side portions in oppositely disposed positions and adapted for yielding engagement, at their free edge portions, with the opposite sides of the window glass.

8. A window glass channel comprising a pair of strips of resilient sheet metal, each bent to provide longitudinally extending and angularly disposed base and side portions, said strips being relatively arranged with their base portions secured one on the other, to form a channel base, said side portions being extended from said base, in oppositely disposed positions, and in convergent relation and having their edge portions inturned toward each other, to provide faces adapted to be held by said side portions in yielding engagement with the opposite sides of the window glass.

9. A window glass channel comprising a pair of strips of resilient sheet metal, each bent to provide longitudinally extending and angularly disposed base and side portion, said strips being relatively arranged with their base portions secured one on the other, to form a channel base, said side portions being extended convergently from said base, in oppositely disposed positions and then reversely toward each other and toward said base, to provide engaging edge-portions for the opposite sides of the glass adapted to yield with relation to said side portions and to be yieldingly supported by said side portions with relation to said base.

10. A window glass channel comprising a pair of strips of resilient sheet metal, one of said strips having an intermediate, longitudinal and approximately right angular bend, to provide angularly disposed base and side portions, the other of said strips having two longitudinal bends spaced apart to provide an intermediate portion, a side portion, which extends at approximately right angles to said base portion, and a spring portion, which extends reversely over the surface of said base portion, toward the side portion, and means for securing the base portions of said strips, one on the other so that said side portions extend in approximate parallelism and said spring portion extends therebetween, thereby to provide yielding engaging means for the opposite sides and the edge of a window glass inserted between said side portions.

11. In combination with a window casing having a groove therein, a pair of resilient sheet metal strips, each formed to provide a base portion, adapted to fit in said groove and secured one upon the other against the bottom thereof, and a side portion extending outwardly from each base portion, at opposite sides of the groove, and bent toward each other and extended convergently inward to provide resilient engaging means for the opposite sides of the window glass inserted therebetween.

12. In combination with a window casing having a groove therein, two pairs of resilient metal strips, each pair having the corresponding portions thereof coincidentally arranged and formed to provide a base portion, adapted to fit in said groove, and each pair being secured one upon the other against the bottom thereof, and a side portion extending outwardly from each base portion, at opposite sides of the groove and bent toward each other and extended convergently inward to provide resilient engaging means for the opposite sides of the window glass inserted therebetween, the convergently and inwardly extending portions of each pair being normally disposed in divergent relation, as and for the purpose set forth.

13. A window glass channel composed of resilient sheet metal and comprising a base adapted to be secured against the window casing, oppositely disposed sides connected to, and extending laterally outward from said base, said sides having end portions arranged yieldingly to engage opposite sides of the glass, and yielding engaging means, connected to said base and disposed between said sides in position yieldingly to engage the edge of the glass, when in position between said sides.

14. In combination with a window casing having a groove therein, a pair of resilient sheet metal strips, each bent longitudinally to provide angularly disposed base and side portions, said base portions being arranged one on the other and secured together to the groove bottom, so that said side portions extend outwardly therefrom at the opposite sides of the groove in position for yielding engagement with the opposite surfaces of the window glass inserted therebetween, and a yielding guide for the edge of the glass formed by transversely extending the opposite edge portion, from the side portion of the strip having its base portion outermost toward said side portion and out of contact with the base portion.

15. In combination with a window casing having a groove therein, two strips of resilient sheet metal extending longitudinally of said groove and secured therein, one of said strips having a portion thereof engaged with one side of the groove adjacent its bottom and the other having a corresponding portion similarly engaged with the opposite side thereof, said strips being laterally extended convergently outward from said points of engagement out of contact with said sides of the groove, to permit the same to yield toward said sides, the outer edge portions of said strips being reversely bent toward each other to provide guiding means for the opposite sides of a window glass, and a flat sheet metal spring disposed in the groove adjacent its bottom and arranged for yielding engagement with the edge of a window glass.

In testimony whereof I have signed my name to this specification.

EDWIN W. M. BAILEY.